United States Patent [19]

Lehman et al.

[11] Patent Number: 4,547,877
[45] Date of Patent: Oct. 15, 1985

[54] SYSTEM FOR SWITCHING MULTIRATE DIGITIZED VOICE AND DATA

[75] Inventors: Harvey R. Lehman, Batavia; Matthew F. Slana, Naperville, both of Ill.

[73] Assignee: AT&T Bell Laboratories, Murray Hill, N.J.

[21] Appl. No.: 502,617

[22] Filed: Jun. 9, 1983

[51] Int. Cl.⁴ .................... H04Q 11/04; H04J 3/16
[52] U.S. Cl. ............................... 370/58; 370/84
[58] Field of Search ..................... 370/58, 66, 84; 179/2 DP

[56] References Cited

U.S. PATENT DOCUMENTS

| | | | |
|---|---|---|---|
| Re. 29,215 | 4/1977 | Carney et al. | 179/15 |
| 2,957,949 | 10/1960 | James et al. | 179/18 |
| 3,401,235 | 12/1964 | Corbin et al. | 179/18 |
| 3,715,505 | 2/1973 | Gordon et al. | 179/15 |
| 4,068,098 | 1/1978 | Thyselius | 370/84 |
| 4,071,701 | 1/1978 | Leijonhufvud et al. | 370/84 |
| 4,168,401 | 9/1979 | Molleron et al. | 179/15 |
| 4,206,322 | 6/1980 | Lurtz | 370/63 |
| 4,277,843 | 7/1981 | Duquenne et al. | 370/84 |
| 4,320,501 | 3/1982 | Le Dieu et al. | 370/63 |
| 4,332,026 | 5/1982 | Alvares, III et al. | 370/66 |

FOREIGN PATENT DOCUMENTS 2265227 10/1975 France .
2386952 11/1978 France .

OTHER PUBLICATIONS

P. Benowitz, S. J. Butterfield, M. P. Cichetti, Jr., and T. G. Cross, "Digital Multiplexers", *The Bell System Technical Journal*, vol. 54, No. 5, May-Jun. 1975, pp. 893-918.

S. Tomita et al.: "Some Aspects of Time-Division Data Switch Switch Design", *Proceedings of the IEEE*, vol. 65, No. 9, Sep. 1977, (New York).

Translation of first part of French Patent 2,265,227 by FASST Translation Service, Teaneck, New Jersey.

*Primary Examiner*—Douglas W. Olms
*Assistant Examiner*—Wellington Chin
*Attorney, Agent, or Firm*—Peter Visserman

[57] ABSTRACT

A system for efficiently switching time multiplexed digital signals of different bit rates. A switch is described including switch modules each of which can switch data and/or voice 56 kilobit/second (kb) full-rate channels and 2.4 kb, 4.8 kb, and 9.6 kb subrate channels. All signals from incoming channels are stored in a signal memory and are transmitted to outgoing channels under the control of addresses stored in a control memory. The frame offset of each channel with respect to a standard superframe is detected and used to calculate the addresses to be stored in the control memory. Various arrangements are shown to minimize high speed signal and control memory requirements, and to simplify the process of generating control memory contents.

30 Claims, 16 Drawing Figures

LAYOUT OF SIGNAL MEMORY 34

DS-1 FORMAT FRAME

FIG. 5

CASE I
DLC 20
A PRECEDES B

| SUBRATE CHANNEL BIT RATE | CONTROL MEMORY LOCATION | CONTROL*** MEMORY CONTENTS |
|---|---|---|
| 56kb* | B<br>B + 920<br>⋮<br>B + 17480 | A<br>A + 920<br>⋮<br>A + 17480 |
| 9.6kb† | B<br>B + 4600<br>B + 9200<br>B + 13800 | A + 920T<br>A + 920T + 4600<br>A + 920T + 9200<br>A + 920T + 13800 |
| 4.8kb** | B<br>B + 9200 | A + 920T<br>A + 920T + 9200 |
| 2.4kb†† | B | A + 920T |

*T = 0, 0≤A, B<920, 20 ENTRIES/HALF PATH
†0≤T≤4, 0≤A, B<4600
**0≤T≤9, 0≤A, B<9200
††0≤T≤19, 0≤A, B<18400
***ANY ENTRY≥18400 IS DECREASED BY 18400

FIG. 6

CASE II
DLC 20
B PRECEDES A
(FOOTNOTES SAME AS FIG. 5)

| SUBRATE CHANNEL BIT RATE | CONTROL MEMORY LOCATION | CONTROL*** MEMORY CONTENTS |
|---|---|---|
| 56kb* | B<br>B + 920<br>B + 1840<br>⋮<br>B + 17480 | A + 17480<br>A<br>A + 920<br>⋮<br>A + 16560 |
| 9.6kb | B<br>B + 4600<br>B + 9200<br>B + 13800 | A + 920T + 13800<br>A + 920T<br>A + 920T + 4600<br>A + 920T + 9200 |
| 4.8kb** | B<br>B + 9200 | A + 920T + 9200<br>A + 920T |
| 2.4kb†† | B | A + 920T |

FIG. 8

CASE III: DLC 20A

| SUBRATE CHANNEL BIT RATE | CONTROL MEMORY LOCATION | CONTROL MEMORY CONTENTS |
|---|---|---|
| 56kb* | B | A |
| 9.6kb† | B | A + 920T OR A + 920T − 4600 |
| 4.8kb** | B | A + 920T OR A + 920T − 9200 |
| 2.4kb†† | B | A + 920T OR A + 920T − 18400 |

CASE IV: DLC 20G

| SUBRATE CHANNEL BIT RATE | CONTROL MEMORY LOCATION | CONTROL MEMORY CONTENTS |
|---|---|---|
| 56kb* | B | A |
| 9.6kb† | B | A |
| 4.8kb** | B | A |
| 2.4kb†† | B | A |

\*$0 \leq B, A < 920$
†$0 \leq B, A < 4600$
\*\*$0 \leq B, A < 9200$
††$0 \leq B, A < 18400$

SYSTEM FOR SWITCHING MULTIRATE DIGITIZED VOICE AND DATA

TECHNICAL FIELD

This invention relates to apparatus for switching time-multiplexed digital signals and more specifically, for switching time-multiplexed digital signals of different bit rates.

BACKGROUND OF THE INVENTION

In recent years, the demands for telecommunications data transmission services have increased sharply. In order to meet these demands, attempts have been made to adapt the large existing telecommunications voice transmission facilities for data transmission. These attempts have been greatly helped by the fact that much of the voice network, especially recent and planned additions to that network, is capable of transmitting voice signals in a digital format.

Voice signals are normally transmitted in digital format over digital facilities at a 64 kilobit per second (kb) rate using digital transmission channels adapted for this bit rate. Data sources and destinations usually only require the use of much lower bit rate channels such as 2.4, 4.8, or 9.6 kb. Therefore, in order to make optimum use of the existing voice transmission facilities in an alternative mode for transmitting data, prior art systems have combined or multiplexed a number of lower bit rate or subrate data channels onto a single voice or voice equivalent channel. One prior art system, the Digital Data System described in *The Bell System Technical Journal (BSTJ)*, V. 54, No. 5, May–June 1975, pp. 811–964, is a transmission system adapted to the digital transmission of data of different bit rates. In the Digital Data System, as one example, 20 subrate data channels operating at a rate of 2.4 kb can be multiplexed onto a single full-rate voice equivalent channel.

In the most common prior art digital transmission systems, digital signals from a particular source are first assembled into bytes, which are further assembled into frames. Single byte signals for a full-rate channel are generated 8000 times per second. The interbyte interval, the frame time, for a full-rate channel is 125 microseconds $$\left( \frac{1}{8000/\text{sec}} = \frac{1 - \text{seconds}}{8000} = 125 \text{ microseconds} \right).$$

The interbyte interval or partial superframe time for a subrate channel is longer; for example, the partial superframe time for a 2.4 kb subrate channel is 20 frame times or 2500 microseconds. Prior art time-division switches are not adapted to switch channels having different interbyte intervals efficiently.

In a communication system, in order to interconnect arbitrary terminals transmitting and receiving over subrate channels, it is necessary to individually switch the subrate channels conveyed by each full-rate channel. Prior art time-division switches which switch all signals at a standard full-rate, such as the 4ESS ™ switch of the Western Electric Company, are not efficient when used for switching individual subrate channels to different destinations. When such switches are used for subrate channel traffic, the subrate channels must be demultiplexed and each channel brought up to a full-rate channel before the subrate channel signals can be switched. This is very costly when the fraction of subrate channel traffic is substantial.

In another prior art system, subrate channel switching is accomplished by connecting each subrate channel directly to a time-division switch. This is also very uneconomical since the cost of the multiplex facilities to assemble a number of subrate channels to a single switch input is much less than the cost of additional inputs connected directly to a time-division switch.

SUMMARY OF THE INVENTION

In accordance with this invention, a switching system for switching time-multiplexed digital signals of different bit rates is implemented by storing all signals carried by an input group of digital carrier lines in a memory and generating signals to an output group of digital carrier lines from the contents of that memory. The subrate and full-rate channel signals are first multiplexed onto input digital carrier lines. Signals from a group of input digital carrier lines are interleaved and stored successively as input signals in a signal memory. Successively read data stored in the signal memory are then distributed as interleaved output signals which are formed into a corresponding group of signals to output digital carrier lines. The signals on these output digital carrier lines are demultiplexed to the corresponding subrate and full-rate channel signals. The group of digital carrier lines from and to one such a switching system may include lines from other modules or other switching systems as well as digital carrier lines from multiplexer/demultiplexers (demux's). The signal memory has the capacity to store the signal from each source channel for the interbyte time or partial superframe time associated with that channel. The addresses for storing successive input signals in the signal memory and for reading successive output signals from the signal memory are derived from at least two sources: a source controlled by a timing source to which the digital carrier signals are synchronized, and a control memory whose contents relate source and destination channels.

In accordance with one specific embodiment of the invention, the source controlled by the timing source generates timing signals defining channels, frames and partial superframes. The control memory is read under the control of addresses from the source controlled by the timing source. The control memory is loaded under the control of a control processor. Further, in accordance with one embodiment of the invention, the source controlled by the timing source is also used to address the signal memory when it is being loaded with an input signal, i.e., during the loading phase. The output of the control memory is used to address the signal memory when an output signal is read, i.e., during the output phase. Alternatively, the source controlled by the timing source can be used to address the control memory and the signal memory during the output phase, and the output of the control memory can be used to address the signal memory during the loading phase.

Each full-rate channel conveying subrate channels includes a subrate signature in the data transmitted on the channel. In accordance with one aspect of this invention, the frame offset, with respect to the frames of a partial superframe of the switching system, of any incoming full-rate channel carrying subrate channels is measured by comparing the subrate signature of that channel with a comparable subrate signature synchronized with the source controlled by the timing source. In one embodiment, the frame offset is used by a processor of the system to modify the control memory data necessary to interconnect the appropriate subrate channels. In an alternative embodiment, the offset is used as a partial address for addressing the control memory and for addressing the signal memory during either the loading or the output phase.

In accordance with alternate embodiments of the invention, a partial address, associated with the full-rate or subrate channel corresponding to each input byte to be stored in the signal memory, is generated for each such byte. The partial address is combined with a partial address controlled by the timing source and is used to address both the signal memory during the loading phase and the control memory; the control memory is used to address the signal memory during the output phase. Alternatively, the partial address is combined with a partial address controlled by the timing source and can be used to address the control memory and the signal memory during the output phase, and the output of the control memory is then used to address the signal memory during the input phase. In one specific embodiment, the partial address corresponds to the frame position within the module partial superframe associated with the subrate channels of the underlying full-rate channel, and is combined with a partial address controlled by the timing source. Advantageously, in this specific embodiment, only one control memory entry and signal memory location per source channel is used. Alternatively, a full address can be stored for each source subrate or full-rate channel. Advantageously, such an alternative arrangement, while requiring per source channel address storage, minimizes the sizes of the signal and control memories.

In accordance with one aspect of this invention, any intermodule or interswitch full-rate channel can carry any mixture of subrate channels whose bit rate is equal to or less than the capacity of the channel. Advantageously, such an arrangement permits transmission and switching facilities to be used more efficiently.

In accordance with another aspect of this invention, a terminal or service circuit connected to one subrate channel can be connected by the system to a different bit rate subrate channel or to a full-rate channel. Advantageously, such an arrangement permits a single group of service circuits to be shared among several groups of terminals during different bit rates, or permits different types of terminals to be interconnected.

In accordance with another aspect of this invention, the control memory is distributed over the digital line controllers. Advantageously, the speed requirements of such a distributed control memory are less severe.

BRIEF DESCRIPTION OF THE DRAWING

The invention may be better understood from the following detailed description when read with reference to the drawing in which:

FIGS. 5, 6, 8 and 15 are charts illustrating the rules for deriving contents of a control memory for such a module;

DETAILED DESCRIPTION

Figure 1:
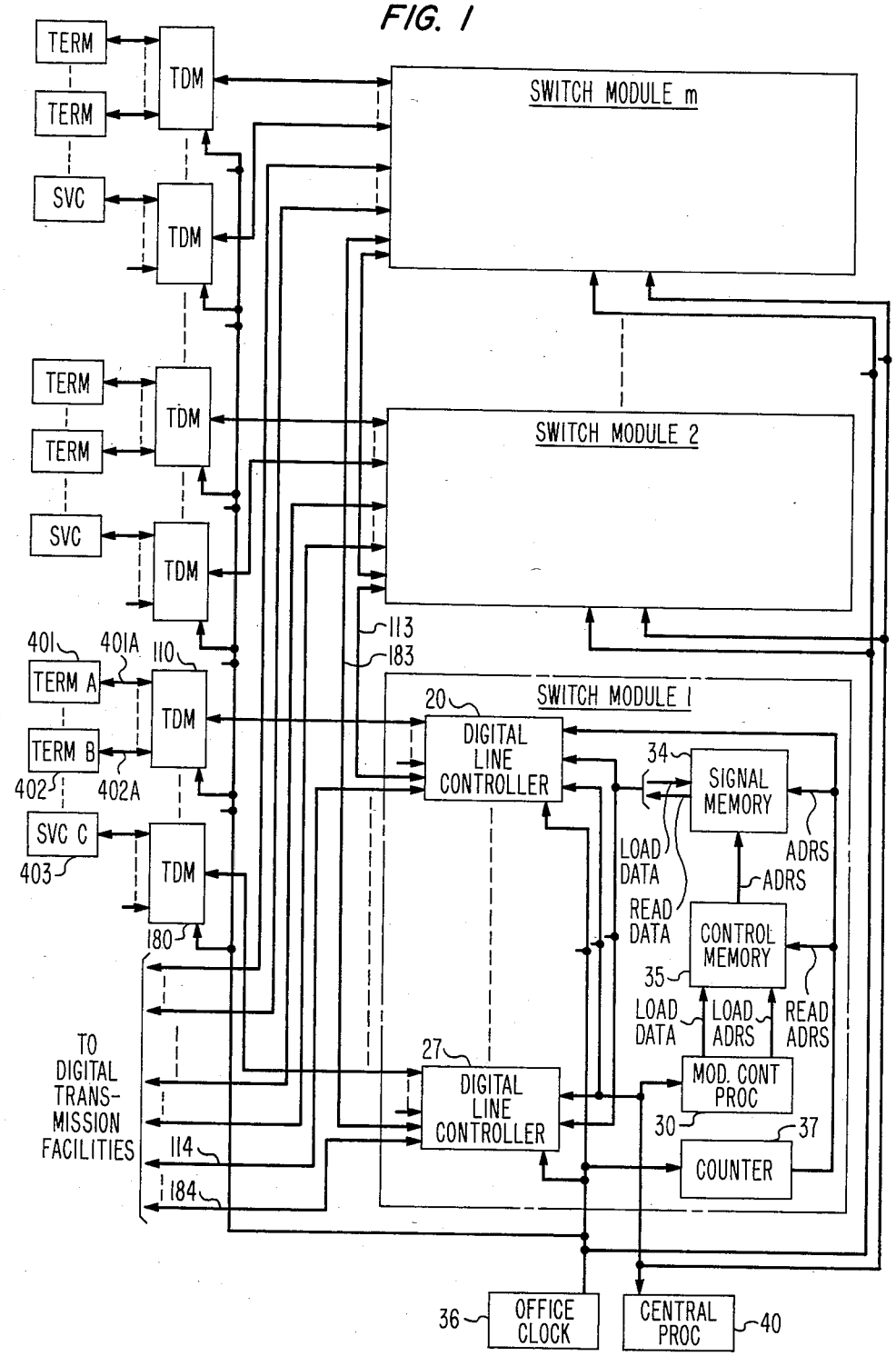
FIG. 1 is a block diagram of a system for switching time-multiplexed digital signals of different bit rates.

FIG. 1 is a block diagram of one exemplary embodiment of the switching system, or switch, of the invention. Shown are switch modules 1, 2, ..., m, each of which is connected to input and output digital carrier lines. These digital lines are connected to time-division multiplexers (TDM) such as 110 and 180, and to digital transmission facilities over digital lines such as 114 and 184. The time-division multiplexers are connected via two-way data links such as 401A and 402A to terminals, including user terminals such as Terminals A (401) and B (402), and service circuits such as Service Circuit C (403). The digital transmission facilities are used for transmitting and receiving digital voice and data to and from other switches or remote TDMs. Digital carrier transmission facilities are well known in the prior art and are described, for example, in N. E. Snow et al., System Overview, *BSTJ* Vol. 54, No. 5, May–June 1975, pp. 811–832. The individual switch modules are interconnected by digital lines such as 113 and 183. Each module can switch channels among 40 digital input and 40 digital output lines.

A block diagram of switch module 1 shows that it includes eight digital line controllers (DLC) 20, ..., 27. Each DLC is connected to five input and five output digital lines, and all eight DLCs communicate with a signal memory 34. Signal memory 34 is a conventional high speed memory which can be readily implemented using commercially available integrated circuits such as the Texas Instruments TI LS200A circuit. The signal memory is used, as described below, to store a signal from any incoming channel until such a time as the destination outgoing channel is ready to receive that signal.

The time pattern of incoming signals will now be described. Counter 37, driven by a timing source, an office clock 36 which is a master clock of the system, defines the time slot intervals of one system superframe, i.e., the partial superframe time 2500 microseconds, associated with the lowest bit rate, 2.4 kb, subrate channel. The superframe is described below with respect to FIG. 2. The superframe for one module, as defined by counter 37 driven by the office clock 36, is synchronous with other module superframes in the switch or office and is referred to hereinafter as the office superframe. Counter 37 also defines all the partial superframes with all subrates. All operations in the switch module are synchronized to the time pattern of the office frame and partial superframes as defined by the office clock and its slave, counter 37. For one module, a superframe contains time slots of 20 frames, 23 channels per frame, each channel present in each of the 40 input and 40 output digital lines. Each superframe therefore consists of $20 \times 23 \times 40 = 18,400$ time slots. There is a direct correspondence between one time slot and one 2.4 kb channel; higher bit rate channels occupy more time slots and a full-rate channel occupies one time-slot per frame or 20 time slots per superframe. One module has the capacity to switch 18,400 2.4 kb subrate channels, or 920 56 kb full-rate channels; in practice it will usually switch different bit rate subrate channels and will have a capacity substantially in excess of 920 channels but below 18,400 channels.

In this illustrative system, each DLC sequentially generates output signals of a corresponding channel of each of its five input digital carrier lines. These signals are interleaved from each of the eight DLCs so that 40 successive output signals to signal memory 34 represent the signals from corresponding channels of the 40 input digital carrier lines connected to the eight DLCs. Signal memory 34 is loaded sequentially during the input phase by being addressed by the output of counter 37 when output signals from the DLCs are stored in memory. The contents of signal memory 34 represent the output signals of the DLCs over the period of one system or office superframe. Each DLC is accessed to transmit a DLC output signal to signal memory 34 and to receive a DLC input signal from signal memory 34 during the time intervals designated for a particular channel of a particular input or output digital carrier line. Signal memory 34 is also accessed to store or read a signal during the time intervals designated for a particular channel of a particular input or output digital carrier line.

Because the signal memory is loaded sequentially over the period of one office superframe, each location in the signal memory 34 corresponds to a time slot of the superframe, the time slot being specified by the contents of counter 37 at the time the location in signal memory is loaded.

Output signals from signal memory 34 are read during the output phase at addresses supplied by control memory 35. Control memory 35 is a conventional high speed memory, similar to signal memory 34. These output signals from signal memory 34 are then sent to the DLCs. The contents of control memory 35 relate each outgoing time slot within a superframe to the incoming signal to be switched to that time slot. The outgoing time slot number is defined by counter 37; the address of the incoming signal to be switched to the outgoing channel corresponding to the outgoing time slot is stored in control memory 35 at the address defined by counter 37. Therefore, when the signal memory 34 reads the byte stored at the address specified by control memory 35, it reads the byte received from that incoming time slot which is to be switched to the present outgoing time slot.

Control memory 35 is loaded by module control processor 30. Processor 30 can be a conventional, commercially available microprocessor such as the Intel 8086. All switch modules of the switch are controlled by a central processor 40. Processor 40 can be a conventional processor for controlling a stored program-controlled switching system. One such processor is the 3B20D Processor described in *The Bell System Technical Journal*, V. 62, No. 1, Part 2, January 1983, pp. 167–410.

Figure 2:
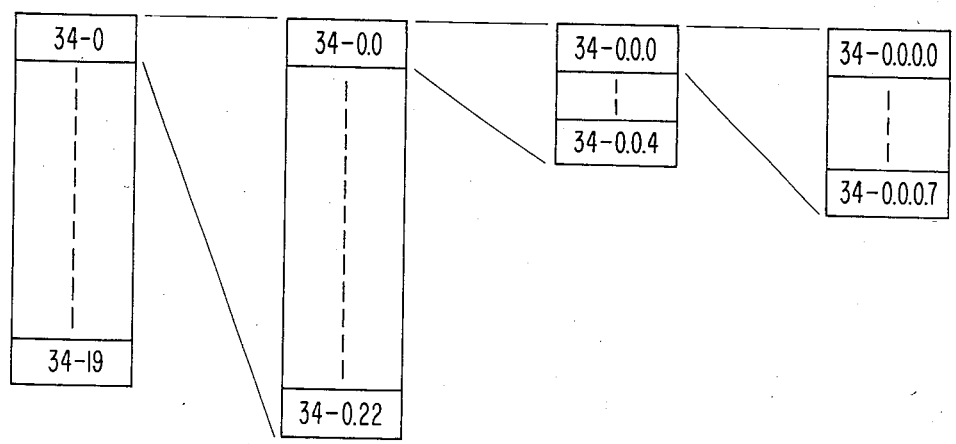
FIG. 2 is a schematic layout of a signal memory for one module of such a system.

FIG. 2 is a layout of signal memory 34. The memory is composed of 20 blocks 34-0, ..., 34-19. Each of these blocks is 920 bytes long and has capacity to store one byte from each full-rate channel of the module. Twenty blocks are provided since each full-rate channel has 20 time slots per superframe, corresponding to the maximum of 20 subrate channels conveyed by a full-rate channel. Typical block 34-0 is expanded to show that it contains 23 subblocks, 34-0.0, ..., 34-0.22. These 23 subblocks correspond to the 23 full-rate channels that are carried by each digital carrier bit stream. Typical subblock 34-0.0 is further expanded to show that it contains five sections, 34-0.0.0, ..., 34-0.0.4, corresponding to the five input digital lines connected to each DLC. Finally, typical section 34-0.0.0 is further expanded to show that it contains 8 bytes, corresponding to the eight DLCs. Each of these bytes directly corresponds to one time slot of a superframe. Memory 34 is addressed sequentially, under the control of counter 37, during its loading phase. Each 2.4 kb subrate channel signal is stored in one byte corresponding to the subrate channel; each 4.8 kb subrate channel signal is stored in two bytes at corresponding positions in two blocks which are ten blocks apart; each 9.6 kb subrate channel is stored in four bytes at corresponding positions in four blocks which are five blocks apart from each other; and each 56 kb full-rate channel signal is stored at the 20 corresponding byte positions in each of the 20 blocks.

In one commonly available digital carrier system, the T-carrier system, voice signals are transmitted as digital signals at 64 kb (kilobits per second). These 64 kb represent samples of the voice taken 8,000 times per second and each encoded into an 8-bit byte. One channel of such a facility then carries 64 kb and carries speech in one direction.

Figure 3:
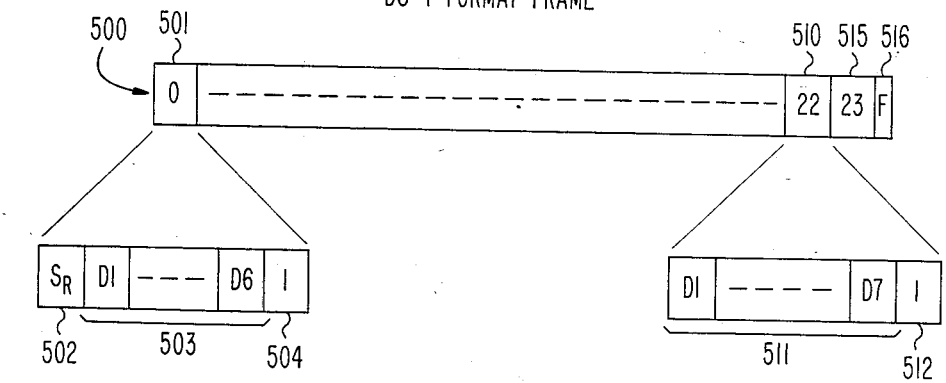
FIG. 3 is a layout of the data format of one frame of a digital carrier signal used for transmitting subrate and full-rate channels.

One digital data transmission facility designed to be used with the T-carrier system is the Digital Data System (DDS), described in the previously cited *BSTJ* V. 54, No. 5, May–June 1975, pp. 811–964. The switch of this exemplary embodiment has been designed to be compatible with DDS transmission systems. The Digital Data System uses the DS-1 format, illustrated in FIG. 3, for transmitting data over T-carrier facilities. One frame of the DS-1 signal format 500, consists of 24 8-bit bytes, bytes 501, ..., 510, 515, plus a framing bit 516. Each byte except byte 23 (515) has one of the two formats shown in the expanded bytes 501 and 510 of FIG. 2. Byte 501 consists of bit 502 labeled $S_R$ representing a subrate signature bit (whose function is explained below with respect to FIG. 4), six bits 503 representing six bits of data, and a single bit 504 which is set to 1 except when control signals (not part of the subrate channel data) are sent. The format of byte 501 is used whenever a byte conveys data of a subrate channel. Byte 510 consists of seven data bits 511 and a single bit 512, set to 1 except when control signals are sent. The format of byte 510 is used whenever a byte conveys data for a full-rate 56 kb channel. Using a multiplexer of the TIDM type for the DS-1 format, one of the 24 channels, channel 23 (515) is reserved for fast synchronization and control purposes, so that only 23 full-rate channels per T-carrier facility are available for conveying digital data. In alternate arrangements which will not be described further herein, a multiplexer can be used which provides a full 24 channels per T-carrier facility. A single framing bit 516, discussed below with respect to FIG. 4, completes one frame of a DS-1 format signal.

Since 8000 bytes per second are sent over any full-rate channel, and seven data bits are available per byte, the capacity of a full-rate channel is 56 kb. Since only six data bits are available for a byte conveying subrate channel data, the total capacity of a full-rate channel conveying subrate channels is only 6 times 8000 or 48 kb. In this description, a full-rate channel conveying only a full-rate data channel is referred to as a 56 kb full-rate channel; the term full-rate channel without modification is used for channels conveying either one 56 kb full-rate channel or a number of subrate channels.

Figure 4:
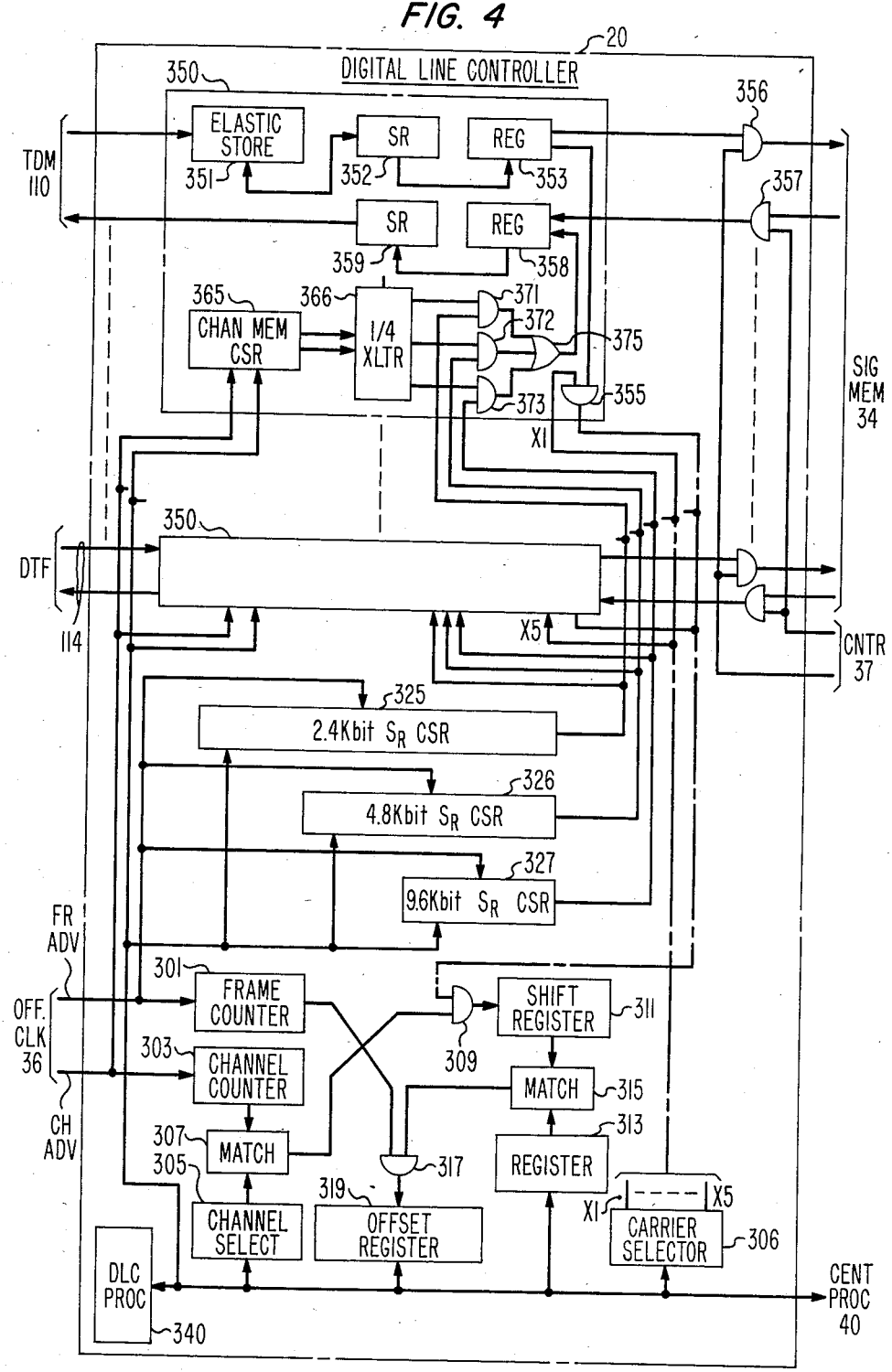
FIG. 4 is a detailed diagram of one digital line controller.

FIG. 4 is a block diagram of typical Digital Line Controller (DLC) 20. It includes five digital line units 350 and common equipment. Each line unit performs the function of frame synchronizing one incoming digital line. Each frame of a DS-1 signal has one framing bit, bit 516 of FIG. 3. The framing bits of consecutive incoming frames of a digital line signal repeatedly form a characteristic bit pattern. Frame detection is achieved on an incoming bit stream by looking for a bit position which repeats this characteristic pattern.

The techniques for obtaining frame synchronism are well known in the digital carrier prior art and described, for example, in T. Benowitz et al., "Digital Multiplexers", *Bell System Technical Journal,* V. 54, No. 5, pp. 893-918, May-June, 1975, which also describes the DS-1 format. Briefly, frame synchronism within a line unit 350 is achieved by the use of an elastic store 351 which contains 256 bits. A searching mechanism, part of the elastic store, examines each bit position of the elastic store, one by one, every frame, in order to find a bit position which repeats the characteristic framing bit pattern. When the framing bit is found, the displacement between the time of the framing bit and the frame time indicated by the office clock is measured. Thereafter the bit in the elastic store which is displaced from the input to the elastic store by this displacement is delivered serially to shift register SR 352, whose output is gated in parallel every channel time to register 353. The output of register 353 is thereby frame synchronized to the office clock. The output of register 353 of each of the five digital line units is gated successively via AND gate 356 to signal memory 34, interleaved with corresponding outputs from the other seven DLCs, under the control of counter 37, in turn controlled by the office clock 36. In this description, for clarity, only one AND gate is shown and described even when a group of leads are gated; AND gate 356, for example, consists of a group of gates to gate the output of a register 353.

The path from source to destination is completed by transmitting the output of the signal memory back to the appropriate digital line unit. AND gate 357 is used to gate the contents of signal memory 34 to register 358 under the control of counter 37. Counter 37 is driven by the office clock 36 and identifies the specific line unit which is to receive the signal stored in signal memory 34 at the address specified by the contents of control memory 35. The output of register 358 is gated in parallel every channel time to shift register 359 whose serial output, advanced under the control of the office clock, is a digital carrier bit stream. The details of inserting a framing bit into the digital carrier bit stream are well known and not described herein.

Much of the rest of FIG. 4 deals with subrate signature generation and detection. When a full-rate channel is broken down into subrate channels, one of the bits, illustrated as bit 502, (FIG. 3) is required to generate a subrate "signature". The subrate signature bit is required primarily to identify different subrate channels within a channel and, secondarily, to indicate the subrate of the channel. A particular communication is identified in a switch by its switch module number, DLC number, digital line unit number, full-rate channel number, and subrate channel number within a channel. In order to associate a given byte of data with a given subrate channel number, it is necessary to have some synchronization signal to identify the first subrate channel within a full-rate channel. When the subrate signature, consisting of a word formed from consecutive $S_R$ bits of one channel, matches the signature of one of the subrates, the subrate of the channel is identified and the first subrate channel is identified.

The three signatures used in the Digital Data System DS-1 format are 01100 for a 9.6 kb subrate channel, 0110010100 for a 4.8 kb subrate channel, and 01100101001110000100 for a 2.4 kb subrate channel. The repetition rate of 9.6 kb signals is five frames and for 4.8 kb signals is 10 frames; these quantities represent a partial superframe associated with a given bit rate. This permits a 5-bit and a 10-bit signature to be used respectively for 9.6 kb and 4.8 kb subrate channels, since a signature need only identify the first subrate channel within a partial superframe. In the DDS system and therefore in this exemplary embodiment, the 20-frame office and system superframe is associated with the 2.4 kb lowest bit rate, which requires a 20-bit signature. For convenience and consistency, 20 frames are also treated as the partial superframe associated with the 2.4 kb rate.

If the incoming signals from one digital transmission facility contain channels from separate sources, the individual full-rate channels from that digital transmission facility will not be in partial superframe alignment either with each other or with the module even when the signals have been put into frame synchronism by the elastic store. Facilities must be provided in the time division switch to take account of this misalignment or offset in order to switch subrate channel signals, identified by a subrate channel number, to the proper destination. This is accomplished by measuring the frame offset, with respect to the appropriate module partial superframe of each full-rate channel in the DLC, notifying the module processor of the system of the amount of this offset for each channel, and using this offset as a correction factor for addresses stored in control memory 35. The signal memory is then read out under the control of correctly adjusted addresses; the output of the signal memory then presents an office partial superframe aligned signal to the DLCs. The correction factor is discussed below with respect to FIGS. 5 and 6.

The process of measuring the frame offset on a given channel will now be described. This process is not used frequently so that the circuitry for accomplishing the function can be shared among the five line units of one DLC. Each DLC contains a DLC processor 340. This can be a microprocessor such as the Intel 8086. The process is initiated when DLC processor 340 loads carrier selector register 306 with the identification of the line unit to be examined in order to select that line unit via an active signal on one of the five leads X1, . . . , X5. Register 313 is loaded with one of the subrate signatures against which the subrate signature of the desired channel is to be matched. Channel select register 305 is loaded with the identity of the one of the 23 channels of the selected line unit to be examined. Channel counter 303 and frame counter 301 are synchronized to the office clock 36 and have outputs indicating the present frame within the office superframe and the present channel within the office frame. When the output of channel counter 303 and channel select register 305 match, as detected by match circuit 307, the output of the $S_R$ bit from register 353 of the selected line unit is gated via AND gate 355, energized by lead X1 of carrier selector 306, and AND gate 309, energized by match circuit 307, into shift register 311.

The result of this action over a number of frames is that shift register 311 is filled with the successive $S_R$ bits from the selected channel. When the output of shift register 311 matches the output of register 313, energizing match circuit 315, the most recent $S_R$ bit gated into shift register 311 was from the last frame of a partial superframe. When the output of match circuit 315 is high, it gates the output of frame counter 301, the current frame within the module superframe, into offset register 319. Offset register 319 then contains the value of the frame offset less 1, since a match is detected during the last frame of a partial superframe. The match is detected at the time the last subrate signature bit of a partial superframe is read, hence, at the time the frame counter has a value corresponding to the last frames; the offset compares the frame time of the initial frame of a partial superframe with that of the initial frame of a module partial superframe.

The offset quantity is read by DLC processor 340, and is adjusted for the error of 1. It is further adjusted to reflect the convention that frame offset is less than the number of frames in one partial superframe and therefore, for 9.6 kb subrate channels is 4 or less, and for 4.8 kb subrate channels is 9 or less. It is also adjusted to reflect the convention that the offset is non-negative. This offset is the quantity T subsequently described with respect to FIGS. 5 and 6.

Another function which must be performed by the digital line controller (DLC) is that of inserting the subrate signature onto signals coming from the signal memory 34. The subrate signature is needed as a subrate channel identifier by the first stage of the time division multiplexer/demultiplexer (TDM) 110 (FIG. 16) in order to distribute each of the subrate channels of a full-rate channel to the destination associated with that subrate channel. Channel memory CSR 365 is a circulating shift register (CSR) whose output is fed back to its input. CSR 365 contains two bits per channel, or 48 bits (the last two not being used because they are associated with a synchronization channel), and must therefore be advanced two bits for every CSR advance signal. Two bits are required to distinguish among the three subrates (2.4, 4.8, and 9.6 kb) and the 56 kb full-rate. CSR 365 is advanced whenever signals for the next channel are to be received. The CSR advance signal is the office clock channel advance signal indicating to all DLCs that signals associated with the next channel are about to be switched. Three circulating shift registers 325, 326, and 327 continuously circulate the subrate signatures of 2.4 kb, 4.8 kb, and 9.6 kb, respectively, and are synchronized to the module and switch superframe. The two bit output of CSR 365 is translated by translator 366 and is used to gate an appropriate subrate signature bit $S_R$ into register 358 from one of the three subrate signature circulating shift registers 325, 326, or 327, via one of AND gates 371, 372, or 373 and OR gate 375. If a full-rate channel is being processed, none of the three AND gates 371, 372, or 373 is activated so that no subrate signature bit $S_R$ is gated to register 358. CSR 365 is changeable under the control of DLC processor 340, in order to allow the processor to set up a different subrate signature pattern for a specific full-rate channel.

The process of generating an entry in control memory 35 will now be described. Each entry is associated with one direction of transmission of data and represents control data for part or all of a half path. For the normal fully duplex connection, an equivalent entry or set of entries is needed for the other direction. When a given input is to be switched to a given output, the control memory 35 location associated with the given output time slot must be loaded with the signal memory address of the given input time slot. The loading of control memory 35 is performed by the module control processor 30. Module control processor 30 must know the identification of the source channel A, its bit rate, the frame offset of incoming subrate channel signals on that channel, and the identification and bit rate of the destination channel B. It is not necessary to know the frame offset of the destination since the frame offset of all output channels is zero, all outputs being synchronized to the partial superframe of the switch and module. The source channel A identification will determine where in the signal memory signals from that subrate channel are stored during the loading phase. The destination channel identification will determine where in the control memory the signal memory addresses of A's signals are stored so that A's signals may be read out at the proper time.

FIGS. 5 and 6 summarize the rules for generating contents of control memory 35 if channel A, with frame offset T, is to be connected to channel B, using a DLC such as DLC 20 as discussed above. The frame offset T can be 0 in case an incoming channel, once frame synchronized, is in partial superframe synchronism. The values of T start at 0, and range to one less than the number of frames in a partial superframe. The entries in FIGS. 5 and 6 also indicate that a 56 kb full-rate channel has its signal stored in 20 positions in the signal memory, whereas the lowest bit rate subrate channel (2.4 kb) has its signal stored only in one position of the signal memory. In order to set up a 56 kb full-rate channel half path, 20 entries must be made in the control memory; the other half path (B to A) requires another 20 entries. Only one entry per half path is required in the control memory 35 for a 2.4 kb subrate channel.

Two different sets of rules are illustrated in FIG. 5 and FIG. 6. In the case of the entries in FIG. 5 (Case I), signals are being entered into the signal memory at an earlier point in the module partial superframe than they are read out; in the case of entries in FIG. 6 (Case II), the read-out time precedes the signal storage time. The entries in FIGS. 5 and 6 are arranged to minimize delay (especially for the higher bit rate subrate channels or for the 56 kb full-rate channels) between the time that an incoming signal is stored in the signal memory and the time that signal is passed to an output 56 kb full-rate channel or a subrate channel.

A and B represent the initial time slot within a module superframe of a subrate channel or 56 kb full-rate channel. If A is the i'th subrate channel (i.e., the channel in the i'th frame of a partial superframe), on the j'th channel, of the k'th input digital line to the m'th DLC, then $A = 920 + 40j + 8k + m$. Here, $0 \leq j \leq 22$, $0 \leq k \leq 4$, $0 \leq m \leq 7$; $0 \leq i \leq 19$ for a 2.4 kb subrate channel, $0 \leq i \leq 9$ for a 4.8 kb subrate channel, $0 \leq i \leq 4$ for a 9.6 kb subrate channel and $i = 0$ for a 56 kb full-rate channel. T has the same limits as i for a given bit rate subrate channel since frame offset is also limited to being one less than the number of frames of a partial superframe. B is similarly calculated. The rule for choosing between FIG. 5 and FIG. 6 is as follows: for 2.4 kb subrate channels, if $A + 920T \geq 18,400$, $C = A + 920T - 18,400$, otherwise, $C=A+920T$; for 4.8 kb subrate channels, if $A+920T \geq 9200$, $C=A+920T-9200$, otherwise $C=A+920T$; for 9.6 kb subrate channels, if $A+920T \geq 4600$, $C=A+920T-4600$, otherwise, $C=A+920T$. Choose FIG. 5 (Case I) if $B \geq C$; choose FIG. 6 (Case II) if $B<C$. Note further that any contents, i.e., pointers to an address in the signal store, in FIGS. 5 and 6, which equal or exceed 18,400 are reduced by 18,400. The signal memory and control memory may be considered circular, with location 0 following location 18,399. Location 0 represents the start of the next module superframe, which comes in time after the last entry, in location 18,399, of the previous superframe.

One half path exists from A to B to when the entries in the control memory have been made in accordance with the rules summarized in FIG. 5 or FIG. 6. Since the inputs to this system are all treated as if they were duplex signals, a corresponding half path must be set up from B to A. This half path may have a different associated value of T since the incoming signal from the B channel may have a different value of frame offset than that associated with the incoming signal from the A channel.

Some of the individual entries of FIG. 5 and FIG. 6 will now be discussed. The entries for a half-path 2.4 kb channel are the simplest: associated with each time slot B is an entry A+920T, where 920T is the time slot displacement associated with a frame offset of T. (There are 920 time slots per frame.) Two entries are required for each half path of a 4.8 kb channel and are placed at locations B and B+9200, ten frames later. The entries for FIG. 5 at these locations are A+920T and A+9200+920T, also ten frames later. The difference between successive locations and successive contents is always the same in FIG. 5 since the time, one partial superframe, between successive A signals and successive B signals is the same. In FIG. 6, the control memory contents table entries are displaced down by one entry to reflect the fact that the B signal occurs earlier in the partial superframe than the A signal of that partial superframe. Effectively, the signal transmitted to B is the signal stored from A in the previous partial superframe. The table entries are wrapped around so that the last entry for a channel in FIG. 5 becomes the first entry in FIG. 6. Thus, the two entries for a 4.8 kb channel in FIG. 6 are A+9200+920T and A+920T, respectively. Four entries are required for a 9.6 kb channel half path, spaced at intervals of 5 frames or 4600 time slots. The entries for a 9.6 kb channel in FIG. 6 are skewed one down from those in FIG. 5. Finally, 20 entries, spaced one frame or 920 time slots apart are required for a 56 kb full-rate channel half path. Again, the entries in FIG. 6 are skewed one down from those of FIG. 5.

In case a 9.6 kb subrate channel is being transmitted over a full-rate channel also transmitting 2.4 kb or 4.8 kb subrate channels, the frame offset with respect to the office superframe for that channel must be formed with respect to the 2.4 kb or 4.8 kb subrate channels, and the subrate signature of the channel must be that of a 2.4 kb or 4.8 kb subrate. Under these circumstances, the value of T could be detected as greater than 4 since such a subrate channel occupies two or four evenly spaced positions in the partial superframe associated with the 4.8 or 2.4 kb subrate. However, for the purposes of generating entries in the control memory, any value of T in excess of 4 can be reduced by five repeatedly until a value of T between 0 and 4 is obtained; this latter value of T is then used for generating the entries shown in FIG. 5 and FIG. 6. Similarly, a full-rate channel carrying 2.4 kb and 4.8 kb subrate channels requires a 2.4 kb subrate signature; if the detected value of T for the 4.8 kb subrate channel exceeds 9, this value may be reduced by 10 before generating the values corresponding to the entries shown in FIG. 5 and FIG. 6.

Figure 7:
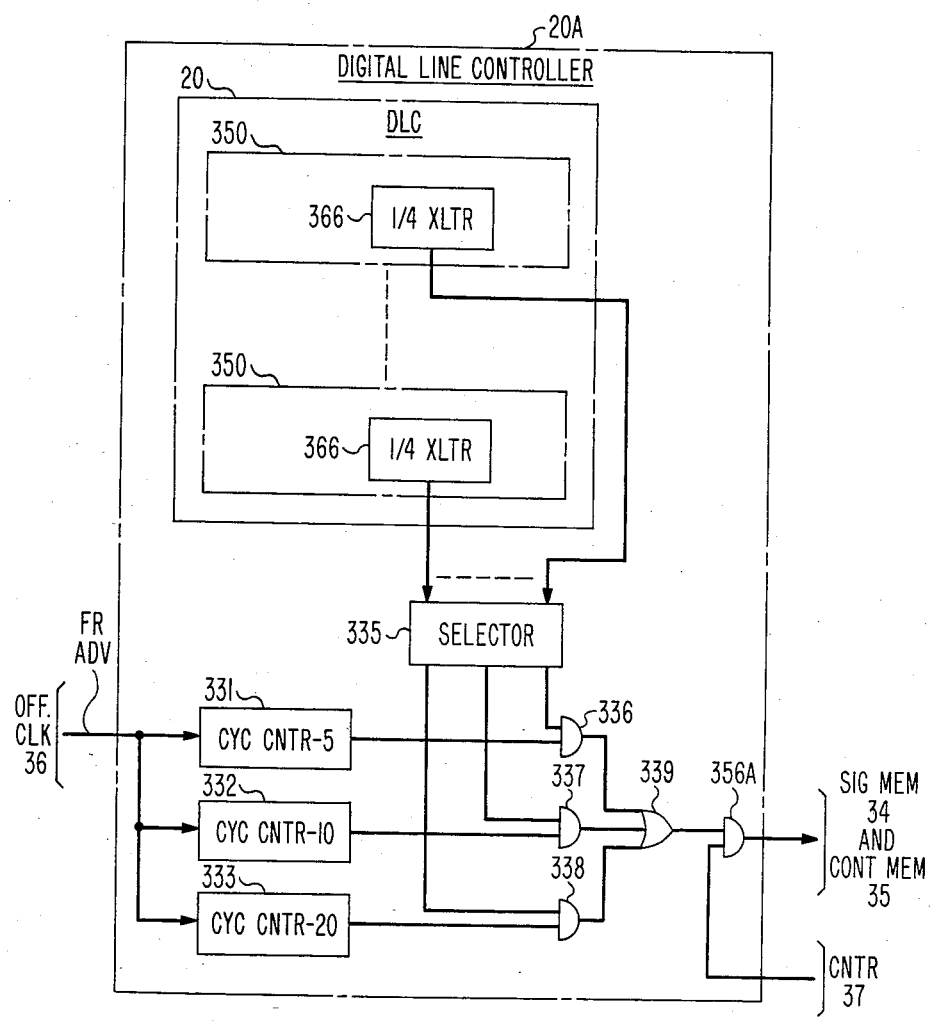
FIGS. 7 and 14 show alternate embodiments of a digital carrier line controller featuring apparatus for generating supplementary addressing signals.

An alternate embodiment, 20A, of the Digital Line Controller (DLC) is illustrated in FIG. 7. Here, the signal memory 34 is loaded using an address part of which is generated by the DLC, and the control memory 35 is addressed using that same address. The DLC generates a quantity corresponding to the current frame number within that partial superframe of the module which corresponds to the subrate channel bit rate of the full-rate channel whose signal is to be stored. The channel memory CSR 365 (FIG. 4) of each line unit 350 maintains the identity of the subrate bit rate. The output of each CSR 365 is connected to ¼ translator 366. The output of the five translators 366 is connected to selector 335, which selects that translator whose line unit is currently being processed. The output of selector 335 is used via AND gates 336, 337, and 338, and OR gate 339, to gate an output of one of three cyclic counters 331, 332 and 333, via AND gate 365A to signal memory 34 and control memory 35. The output of gate 356A is used in the addressing of signal memory 34 and control memory 35 in such a way that it selects one of the twenty blocks of these memories. If output of gate 356A is h, then the signal from the DLC will be stored in the h'th block of signal memory 34. The three cyclic counters keep track of the current frame within a partial superframe of 5, 10 or 20 frames, corresponding to the 9.6, 4.8 and 2.4 kb subrates, respectively. The cyclic counters count from 0 to 4, 0 to 9, and 0 to 19, and are then reset to 0.

With this arrangement, each subrate channel has its signals stored in only one location of signal memory 34 and there is only one entry in control memory 35 which corresponds to that location. As a result, each signal is stored only for the interbyte interval of that signal and is read out sometime during that interbyte interval. If a full-rate channel carries 20 2.4 kb subrate channels, bytes for each of these 20 channels are stored in a separate location. Conversely, if the full-rate channel is carrying a single full-rate 56 kb channel, then each byte from that full-rate channel is stored in the same location, since each byte is from the same channel.

The output of gate 356A is used to select one of the 20 blocks 34-0, ..., 34-19 shown in FIG. 2 in the following manner. The outputs of gate 356A are treated as the upper bits of the address of signal memory 34 and control memory 35. Since a block contains 920 entries (0-919), all locations and their multiples in the range of 920-1023 are either skipped or not equipped. The lower bits of the address of the memories 34 and 35 are derived from the clock 36 and counter 37 and correspond to intraframe data including the DLC identification (1 of 8), line unit identification (1 of 5), and channel numbers within a frame (1 of 23); these quantities are adequate to make an intrablock, (1 of 920) selection.

Using this arrangement, the entries in the control memory for the half path from channel A to channel B are those indicated in FIG. 8. In each case, only one control memory entry is stored per subrate or 56 kb full-rate channel. The entry is always stored at the location B, corresponding to the position of the destination channel within an output partial superframe of the module. The entry will point to the location where channel A's signal is stored which is either A+920T or A+920T less one partial superframe. This corresponds to channel A's identification modified by the frame offset. Note here also that any entry in the control memory whose value equals or exceeds the number of slots in one partial superframe is reduced by that number for the same reasons previously discussed with respect to full superframes in FIG. 5.

Figure 9:
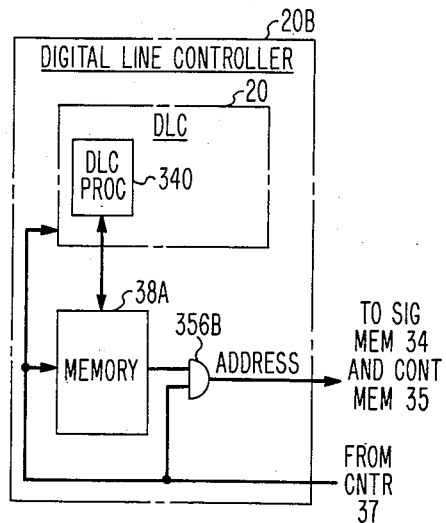
FIGS. 9-13 show alternate apparatus in a digital carrier line controller for generating signal and control memory addresses, and alternate apparatus for the control memory.

FIGS. 9-13 show several further arrangements for addressing signal memory 34 and control memory 35, and for distributing control memory 35 among the DLCs. In FIG. 9, DLC 20B includes DLC 20 and memory 38A. Memory 38A is an intermediate memory in DLC 20B, driven by counter 37, used to address signal memory 34 in the load phase and to address control memory 35 via AND gate 356B. Memory 38A is loaded by DLC processor 340 on the basis of data provided by module control processor 30 and stores a common address for each time slot of a subrate or 56 kb full-rate channel. Memory 38A allows for the use of a single arbitrary address memory location per subrate or 56 kb full-rate channel in both signal memory 34 and control memory 35, thus reducing the size of these high speed memories. (While the use of DLC 20A requires only one location per channel in signal memory and in control memory, these locations are restricted in their address; practically speaking, it would be difficult to take directly advantage of the DLC 20A arrangement to reduce the size of the signal and control memories.) Memory 38A requires 20 entries for each full-rate 56 kb channel, four entries for each 9.6 kb subrate channel, two entries for each 4.8 kb subrate channel, and one entry for each 2.4 kb subrate channel, for each half path. Where multiple entries are required, all entries point to the same address in signal memory 34 and control memory 35.

Figure 10:
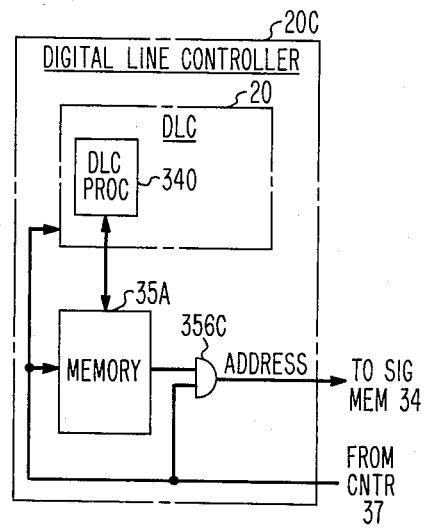

In FIG. 10, illustrating DLC 20C, the control memory 35 has been distributed to the DLCs. That portion which is in one DLC is shown within DLC 20C as control memory 35A. This control memory 35A is addressed by the counter 37. The contents of control memory 35A for DLC 20C, the 0'th DLC of module 1, consist of the contents of all the addresses of the full control memory 35 addressed in common with those locations of bytes of signal memory 34 whose byte identifier is i.j.k.0, such as 0.0.0.0. illustrated in FIG. 2. Similarly, the contents of another memory like 35A in the 7'th DLC, DLC 27C (not shown), consist of the contents of all the addresses of the full control memory 35 addressed in common with those locations of bytes of signal memory 34 whose byte identifier is i.j.k.7. The output of memory 35A is gated via AND gate 356C to address the signal memory 34 during the read phase. Memory 35A is loaded by DLC processor 340 on the basis of data provided by module control processor 30. This arrangement reduces the amount of very high speed memory required by permitting the control memory to work at DLC speeds.

Figure 11:
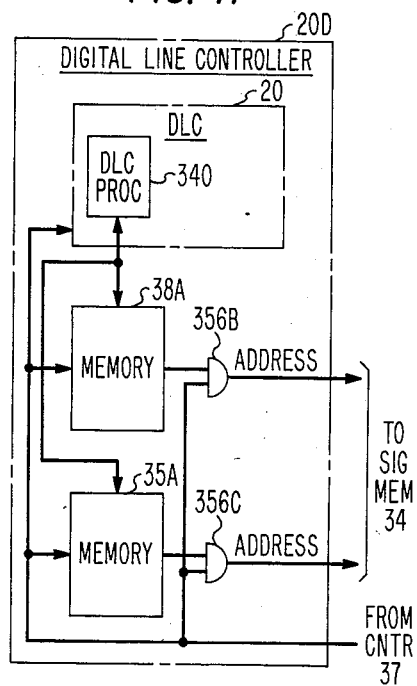

FIG. 11 illustrates DLC 20D which contains both of the memories 38A and 35A. This arrangement minimizes the size of the signal memory 34, and permits the control memory to work at DLC speeds. The outputs of AND gates 356B and 356C are used to address signal memory 34 during the load and read phases, respectively. Memories 35A and 38A are loaded by DLC processor 340 on the basis of data provided by module control processor 30.

Figure 12:
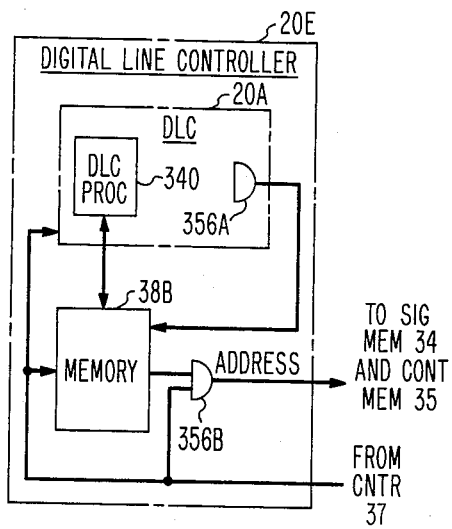

In FIG. 12, illustrating DLC 20E, the type of addressing arrangement described for the implementation of FIG. 7 is used to address an intermediate DLC memory 38B, similar to memory 38A described above with reference to FIGS. 9 and 11. FIG. 12 shows DLC 20E which includes DLC 20B (FIG. 7) and memory 38B. As previously discussed, this arrangement provides the advantage that only one control memory entry need be generated for a 56 kb full-rate channel or for any subrate channel. The implementation of FIG. 12 then has the additional advantage, described above with respect to FIG. 9, that the size of the signal memory 34 and control memory 35 are minimized. Memory 38B is addressed partly from counter 37 and partly from gate 356A, previously described with respect to FIG. 7. Only one entry per half path is made in memory 38B for the reasons described with respect to DLC 20A. In DLC 20E, the output of memory 38B is gated via AND gate 356B to both the signal memory 34 during the read phase and the control memory 35. Memory 38B is loaded by DLC processor 340 on the basis of data provided by module control processor 30.

Figure 13:
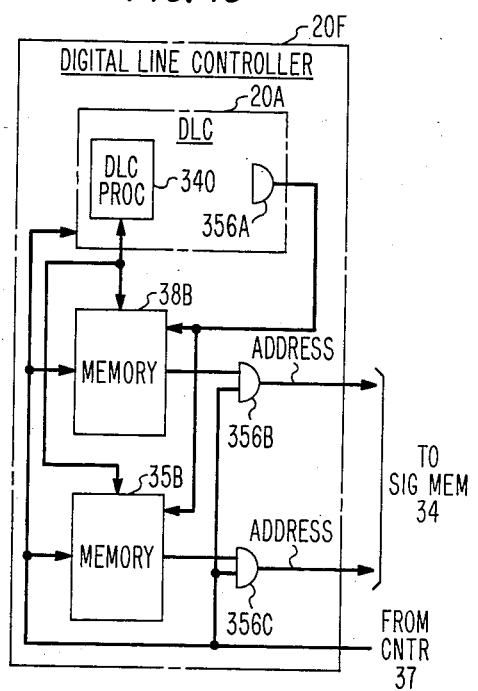

Finally, the arrangement of FIG. 13 combines the advantage of the arrangement of FIG. 12, with the reduction of speed requirements of the control memory, discussed with respect to FIG. 10. In FIG. 13, DLC 20F includes DLC 20A, memory 38B, and a distributed portion 35B of control memory. The output of memory 38B is used to address signal memory 34 during the load phase via AND gate 356B. The output of control memory 35B is used to address signal memory 34 during the read phase via AND gate 356C. Memories 38B and 35B, are both addressed partly from counter 37 and partly from gate 356A, previously described with respect to FIG. 7. Memories 38B and 35B are both loaded under the control of DLC processor 340 on the basis of data provided by module control processor 30.

Figure 14:
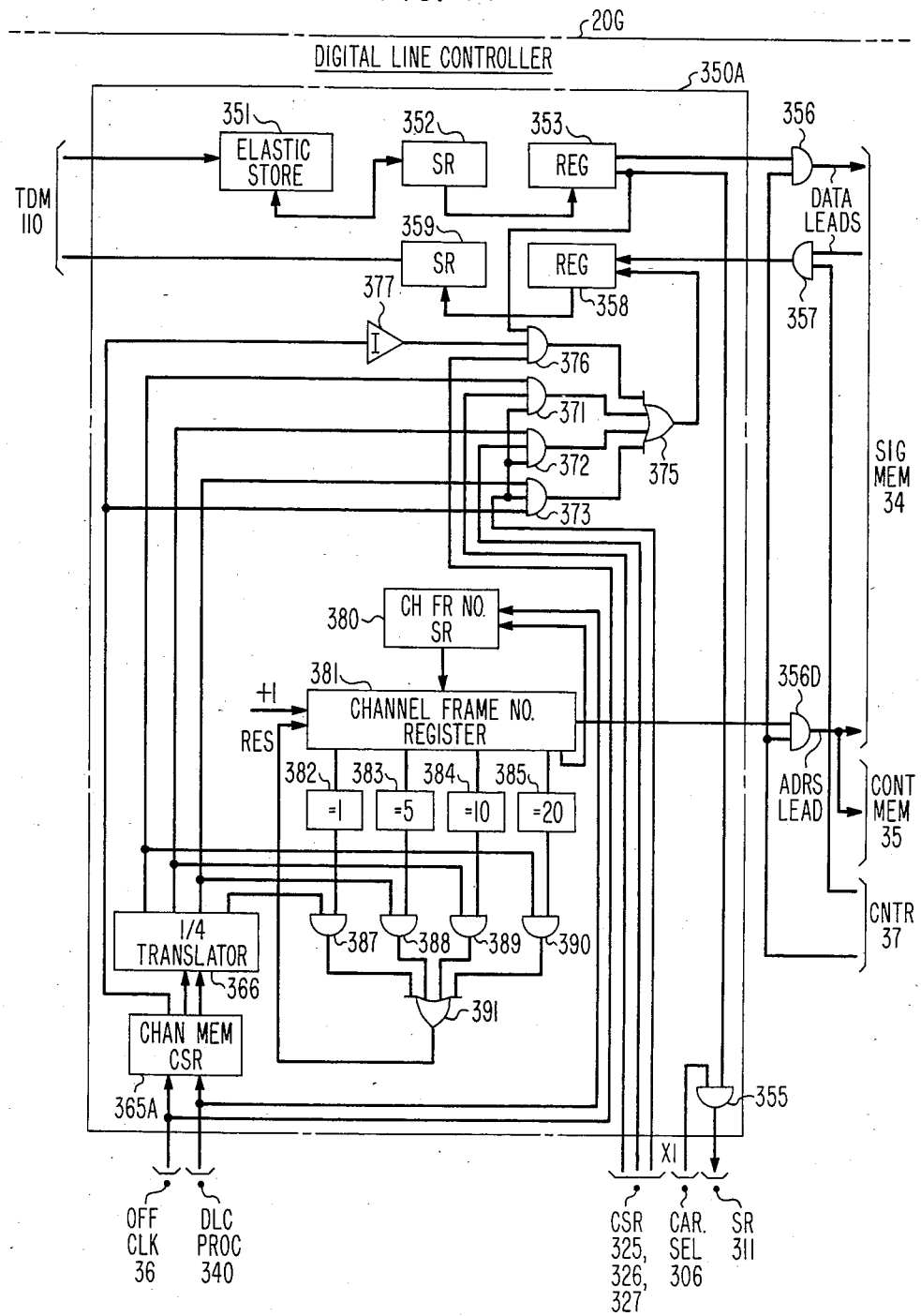

FIG. 14 illustrates another alternate embodiment, 20G, of the DLC. Here the controller maintains a frame count within the partial superframe of each channel and uses the frame count in the same way that the module partial superframe frame count is used in DLC 20B. The result is that each input is stored in a position of the signal memory 34 corresponding to the subrate channel position of that input within the partial superframe of a particular full-rate incoming channel. The same addressing mechanism is used for addressing the control memory 35 which points to the byte in memory corresponding to the opposite direction of data transmission. With this arrangement, all signal entries for a given 56 kb full-rate channel or for a subrate channel can be placed in one byte of the signal memory, and only one entry need be made at the corresponding location in the control memory to point to the byte associated with the other end of a half path. This arrangement also reduces the number of entries in the control memory and simplifies the process of generating control memory entries, but requires more per channel memory in the DLC.

In DLC 20G, the line unit 350 has been expanded to include additional elements and is illustrated as line unit 350A. Channel frame number shift register 380 is used to store the current frame number within a partial superframe of each full-rate channel. This frame number varies cyclically within a subcycle from 0-19 for a full-rate channel carrying 2.4 kb subrate channels, from 0-9 for one carrying 4.8 kb subrate channels, from 0-4 for one carrying 9.6 kb subrate channels; the frame number remains 0 for a full-rate channel carrying only one full-rate 56 kb channel.

Channel frame number shift register 380 stores 24 frame numbers, one for each channel. (The frame number for the last channel, the synchronizing channel, is not used.) At the beginning of each channel time, the output of shift register 380 is shifted to channel frame number register 381, from which it is gated via AND gate 356D to the addressing mechanism of control memory 35 and signal memory 34. There, it selects one of twenty blocks, as previously described with respect to FIG. 7. Register 381 is then incremented and checked for the value of 1 by logic block 382, 5 by logic block 383, 10 by logic block 384, and 20 by logic block 385. The output of ¼ translator 366 identifies the lowest bit rate subrate channel being carried by the current full-rate channel. This output is used to select the appropriate condition (1, 5, 10, or 20) representing overflow beyond the completion of a partial superframe cycle, and to gate a reset signal via AND gates 387, 388, 389, and 390 and OR gate 391 to the channel frame number register if overflow has been detected. The output of channel frame number register 381 is then gated back to the input of the channel frame number shift register 380.

In this arrangement, the outgoing channel subrate signature is the same as the incoming channel subrate signature and is gated into register 358 from register 353 by AND gate 376, unless inhibited by inverter 377, and OR gate 375. The other inputs to OR gate 375 are retained to allow a subrate signature to be generated from the module, synchronously with the module partial superframe. These signals are gated under the control of a third bit per channel added to the per channel memory for this purpose to channel memory CSR 365A. If this third bit is "0", the output of inverter 377 is high, and the output subrate signature is generated from the input subrate signature as described; if the third bit is "1", the subrate signature is generated in the same way previously described with respect to FIG. 4.

With this arrangement, the number of the current subrate channel, i.e., its frame number within the partial superframe of a channel, is always identified and is gated via AND gate 356D to address the control memory 35 and signal memory 34. Thus, a signal is stored in a location or time slot of signal memory 34 corresponding to the time slot of the subrate channel within a partial superframe of its own full-rate channel. Arrangements comparable to those of FIGS. 12 and 13 are also possible using DLC 20G as a building block instead of DLC 20A.

FIG. 15 specifies the control memory contents for this arrangement for the case of the connection from A to B, previously discussed. In this embodiment, it is also not necessary to distinguish whether A precedes B, since both A and B are stored only once in each partial superframe. The address which must be stored to allow the A signal to be read at the correct time is therefore the address associated with the full-rate channel conveying channel A and the position within a partial superframe of A. Thus, FIG. 15 shows that a pointer to A is stored in location B of the control store 35. This arrangement further simplifies the process of loading the control memory 35 since only one entry must be made for each half path for any subrate channel or for a full-rate channel transmitting a 56 kb data stream, and since the process of generating that entry is less complex. Output channels are not superframe synchronized in this arrangement.

Figure 16:
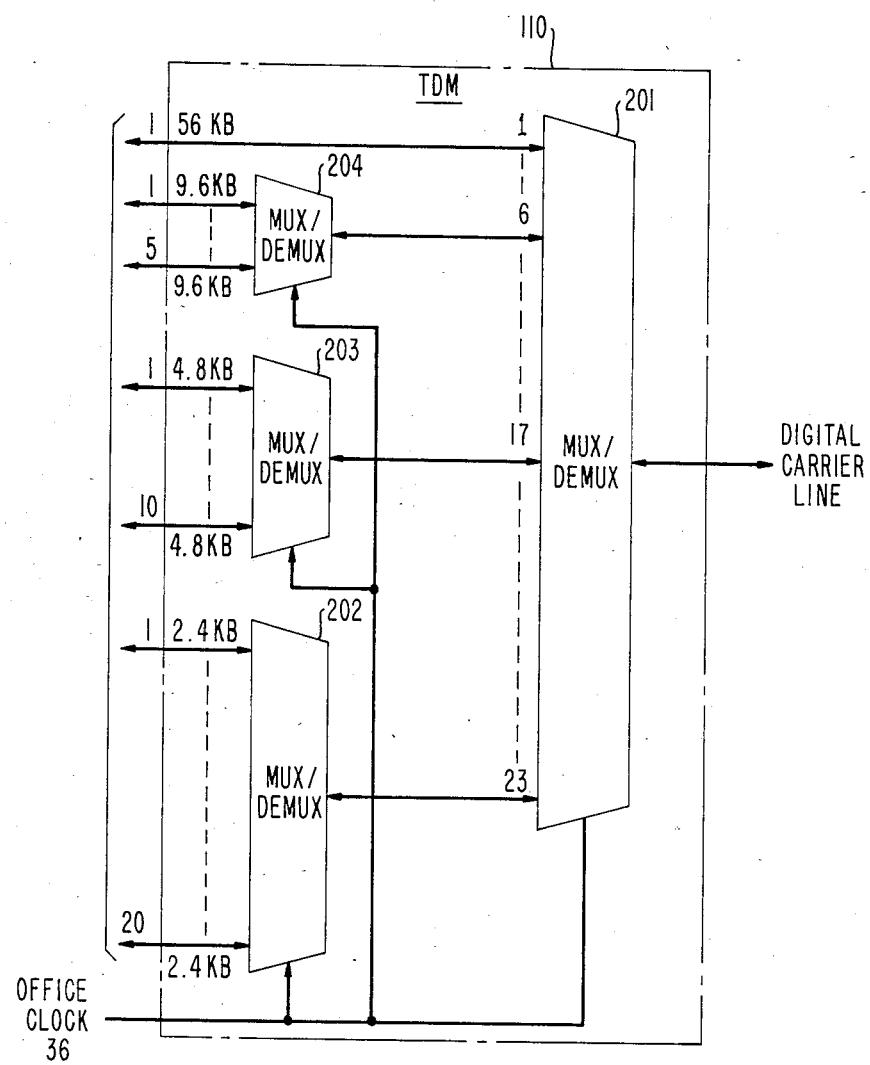
FIG. 16 is a block diagram of a time division multiplexer/demultiplexer capable of serving different subrate channels.

FIG. 16 illustrates the data multiplexers of FIG. 1 such as a T1 Data Multiplexer/Demultiplexer (demux) TDM 110, of the same general type described in the Benowitz et al., article on pp. 893-912 of the May-June 1975 issue of the *Bell System Technical Journal*. Briefly, demux 201 is connected to 23 input/outputs, either demux's such as 202, 203, or 204, or sources and destinations of 56 kb signals. Block 201 itself generates the bytes associated with the 24th or synchronization channel (illustrated as byte 505 in FIG. 3). Demux's 202, 203, and 204 generate and distribute 64 kb streams each representing a full-rate channel from incoming and to outgoing data bit streams operating at bit rates of 2.4 kb, 4.8 kb, and 9.6 kb, respectively. Each full-rate channel conveys groups of 5, 10, or 20 bytes each byte within the group repeated at the partial superframe rate associated with 9.6 kb, 4.8 kb or 2.4 kb subrate channels.

In this system, terminals connected to subrate channels operating at different bit rates can be connected by the switch. Signals from the lower bit rate channel are repeated the appropriate number of times while being transmitted to the higher bit rate channel; signals to the lower bit rate channel are only transmitted the appropriate fraction of times. The terminals to be connected must be capable of operating with data at the lower bit rate. This technique is employed to permit sharing of a service circuit, such as a dialing receiver, for terminals operating at different bit rates. For example, in FIG. 1, terminal A (401) is a 2.4 kb terminal, terminal B (402), is a 4.8 kb terminal, and service circuit 403 is capable of handling 2.4, 4.8 or 9.6 kb terminals. A connection can be set up between either terminal A or terminal B and service circuit 403. This arrangement allows such a service circuit to be shared over more terminals and reduces the number of required service circuits.

In this system, subrate channels of different bit rates may be transmitted over full-rate channels between switching modules located in the same or different switches. When this is done, the subrate signature of the lowest bit rate signal must be used, and the higher bit rate subrate channels must use multiple equally spaced lower subrate channels. For example, if eight 4.8 kb channels and four 2.4 kb channels are to be transmitted over one full-rate channel, the 2.4 kb subrate channel signature must be used, and each 4.8 kb subrate channel must occupy two of the 20 subrate channel positions, the two being spaced ten positions apart. One satisfactory grouping would be to have the 2.4 kb subrate channels occupy subrate channel positions zero, one, ten and eleven, and to have the eight 4.8 kb channels occupy subrate channel positions two and twelve, three and thirteen, . . . , nine and nineteen. Use of this feature requires multiple control and signal memory entries for switching those subrate channels being conveyed on a channel carrying lower bit rate subrate channels if a DLC such as 20A or 20G (FIGS. 7, 9, 11, 12, 13 and 14) is used. The advantages associated with the use of one of these DLCs would be retained for the bulk of the subrate and for all the 56 kb full-rate channels. If multi-bit rate first stage multiplexers become available, their output can be similarly switched.

While the exemplary embodiments show the control memory being used as a source of addresses during the output phase, it is also possible to use the control memory as an address source during the input phase; in that case, the other addressing mechanism of the various exemplary embodiments shown for addressing the signal memory during the input phase would instead be used to address the signal memory during the output phase. The signal memory output would be generated at the same time that the control memory is read, the input would then be stored in a signal memory location specified by the contents of the control memory, which would subsequently be read at the correct time via the other addressing mechanism.

For some applications, it may be desirable to switch 16 kb data as well as 2.4 kb, 4.8 kb and 9.6 kb data. This can be accomplished in several ways. One way, using the DLC 20 or 20C approach is to simply triple the length of a superframe, increasing the size of signal memory 34 and control memory 35 accordingly. This allows the system superframe to contain integral numbers of all partial superframes. However, the DLC 20A, 20B, 20D, 20E, 20F and 20G approach can also be used advantageously without increasing the size of the memories associated with those arrangements, by simply adapting the DLC to recognize more subrate signatures. Alternatively, the approach described in U.S. Pat. No. 4,206,322 of J. W. Lurtz, issued June 3, 1980 can be used. In accordance with that approach, the switch module operates simultaneously with two superframes, one based upon the 2.4 kb signal, the other based upon a 16 kb signal. Each superframe has its own associated signal and control memory. For any particular time interval, only the signal from one of the signal memories is read and transmitted to a DLC, in accordance with the contents of the two control memories. control memory. For any particular time interval, only the signal from one of the signal memories is read and transmitted to a DLC, in accordance with the contents of the two control memories.

1.2 kb data is also quite prevalent in present systems. If only small numbers of 1.2 kb channels are used, they can be switched as 2.4 kb channels using techniques described in U.S. Pat. No. Re 29,215 of A. C. Carney et al., issued May 10, 1977. These techniques allow a lower bit rate channel to be served by a higher bit rate demux; in the switch, the channel is switched at the higher bit rate. If many channels of 1.2 kb data are to be switched in a given application, the superframe of the office can be doubled in length, control and signal memories doubled in length, and the digital line controllers modified to handle an additional subrate signature and to recognize frame displacements up to 39. The changes required are straightforward. The system described herein can be readily adapted to switching any subrate bit rate which is divisible into 48 kb. Again the approaches previously discussed with respect to alternate types of DLCs can be used to reduce the size of memories and/or the number of memory entries per channel. Other bit rates could be accommodated by changing the clock and counter arrangements.

The exemplary embodiments of the switch of the invention have been described as being connected to two-way channels. One-way channels can also be used in this arrangement. If one way channels are used, only single half paths are set up for a one-way connection.

One-way channels can also be used for a broadcast connection in which one source channel transmits a signal to many destination channels. This can be accomplished by setting up a control memory entry or control memory entries for the broadcast destination channels all of which point to the broadcast source channel.

One or more switch modules of the type described herein can also be used as an adjunct to a more conventional time-division switch such as the Western Electric 4ESS switch. Such a module could be connected to 4ESS for switching its subrate traffic. Any full-rate channels carrying subrate traffic can be assembled by a 4ESS switch into a group of digital lines. These digital lines can then have their subrate channels switched by the switch modules of this invention and returned to the 4ESS switch.

It is to be understood that the above-described embodiment is merely illustrative of the principles of this invention; other arrangements may be devised by those skilled in the art without departing from the spirit and scope of the invention.

What is claimed is:

1. A time division multiplex switching system for switching multirate digitized byte-organized signals from source channels carried on input digital carrier lines to destination channels carried on output digital carrier lines, each of said source channels having a predetermined byte rate, each of said input digital carrier lines carrying a predetermined plurality of full-rate channels, comprising:

means for generating timing signals defining intervals for digital carrier timing;

means responsive to said timing signals for generating sequential address signals;

digital line controller (DLC) means responsive to said timing signals for assembling byte-organized input signals from said input digital carrier lines into DLC output signals and for distributing byte-organized DLC input signals to said output digital carrier lines;

means for determining an indication of the frame offset of signals for each of said source channels with respect to said timing signals;

processor means responsive to said frame offset indications for calculating signal memory addresses;

signal memory means having the capacity to store at least one byte of said byte-organized signals for each source channel for an interval of time defined by the byte rate of the source channel;

control memory means for storing at least one of said calculated signal memory addresses for each source channel in said input digital carrier lines and for generating signal memory addressing signals;

said signal memory means being responsive to said signal memory addressing signals and to said sequential address signals to store successive bytes of said DLC output signals and to generate successive bytes of said DLC input signals.

2. A time division multiplex switching system for switching multirate digitized byte-organized signals from source channels carried on input digital carrier lines to destination channels carried on output digital carrier lines, in which each of said input and output digital carrier lines transmits a predetermined number of full-rate channels, each of said source channels having a predetermined byte rate, comprising:

means for generating timing signals defining intervals for digital carrier timing and defining full-rate channel, frame and partial superframe intervals;

means responsive to said timing signals for generating sequential address signals;

digital line controller (DLC) means responsive to said timing signals for assembling byte-organized input signals from said input digital carrier lines into DLC output signals and for distributing byte-organized DLC input signals to said output digital carrier lines;

signal memory means having the capacity to store at least one byte of said byte-organized signals for each source channel for an interval of time defined by the byte rate of the source channel;

control memory means for storing at least one signal memory address for each source channel in said input digital carrier lines and for generating signal memory addressing signals;

means responsive to said timing signals for achieving frame synchronism of signals on said input digital carrier lines;

means for measuring the magnitudes of frame offset with respect to said timing signals defining intervals for partial superframes for full-rate channels on said input digital carrier lines and for generating frame offset signals representing said magnitudes; and processor means responsive to said frame offset signals to generate and store said signal memory addresses in said control memory means;

said signal memory means being responsive to said signal memory addressing signals and to said sequential address signals to store successive bytes of said DLC output signals and to generate successive bytes of said DLC input signals.

3. The switching system of claim 2 in which:

said processor means are adapted to generate signal memory addresses adjusted to compensate for said magnitude of frame offset; and said DLC means are responsive to said DLC input signals generated by said signal storage means in response to said signal memory address signals to distribute said byte-organized DLC input signals synchronized to said timing signals defining partial superframes to said full-rate channels on said output digital lines.

4. The switching system of claim 2 in which said control memory means is responsive to said sequential address signals for generating said signal memory addressing signals.

5. The switching system of claim 4 in which said means for generating sequential address signals further comprises:

means for storing the identity of the subrate of each full-rate channel and for generating a subrate identity output signal each time a byte from the corresponding full-rate channel is to be stored in said signal memory means; and means responsive to said timing signals and said subrate identity output signals to generate said sequential address signals.

6. The switching system of claim 5 in which said means for generating said sequential address signals further comprises:

means responsive to said timing signals for generating different signals representing current frame count for different partial superframes;

means responsive to said subrate identity output signals for selecting one of said different signals;

means responsive to said timing signals for generating intraframe time signals; and means for combining said selected one of said different signals with said intraframe time signals.

7. The invention of claim 4 in which said means for generating said sequential address signals comprises:

means for storing the identity of the subrate of each full-rate channel;

storage means for storing sequential address signals;

means for generating different signals representing current frame numbers for different partial superframes;

means responsive to said stored identity for selecting one of said different signals;

means for generating intraframe time signals;

said storage means being responsive to said intraframe time signals and said selected one of said different signals to generate said sequential address signals.

8. The switching system of claim 4 further comprising:

means for storing the identity of the subrate of each full-rate channel; and in which said means for generating sequential address signals is responsive to said stored identity to generate said sequential address signals.

9. The switching system of claim 4 further comprising:

means for storing the identity of the subrate of each full-rate channel;

means for storing an indication of the frame offset for each full-rate channel; and in which said means for generating sequential address signals is responsive to said stored identity and said stored indication to generate said sequential address signals.

10. The switching system of claim 4 in which said digital carrier input and output lines are formed into groups in which each of said DLC means, signal memory means, and control memory means is associated with one of said groups, and in which a digital carrier output line from one of said groups is connected to a digital carrier input line to another of said groups.

11. The switching system of claim 2 in which said processor means is further adapted to generate and store at least one first signal memory address and at least one second signal memory address, associated with a first source channel and a second destination channel operating at different byte rates, at locations in said control store means associated with said second and first channels to transmit signals between said first and second channels.

12. The switching system of claim 1 in which said DLC means is adapted to distribute a plurality of subrate channels operating at two different byte rates into a single full-rate channel on one of said digital carrier output lines.

13. The switching system of claim 12, in which each full-rate channel has an associated stored identity of its subrate byte rate; in which a selected full-rate channel transmits a first subrate channel operating at a multiple by the byte rate associated with the stored identity corresponding to said selected full-rate channel; and in which bytes associated with said first subrate channel are transmitted from said signal memory means to said DLC means at a rate which is said multiple of said associated byte rate.

14. The switching system of claim 1 in which said DLC means comprises a plurality of units and in which said control memory means is distributed over said plurality of units.

15. The switching system of claim 1 in which said digital carrier input and output lines are formed into groups in which each of said DLC means, signal memory means, and control memory means is associated with one of said groups, and in which a digital carrier output line from one of said groups is connected to a digital carrier input line to another of said groups.

16. In a time-division multiplexed switching system for switching multirate digitized byte-organized signals from source channels carried on input digital carrier lines to destination channels carried on output digital carrier lines, each of said source and destination channels having a predetermined byte rate and each having associated designated time intervals for accessing said channels, each of said input digital carrier lines carrying a predetermined plurality of full-rate channels, a method of switching the signals from a first one of said source subrate channels of said input digital carrier lines to a second one of said destination subrate channels of said output digital carrier lines, said first source and second destination subrate channels operating at a predetermined byte rate, comprising the steps of:

determining the frame offset of signals of said first subrate channel;

calculating an identity of said first subrate channel adjusted for said frame offset;

storing said identity of said first subrate channel at a location associated with the identity of said second subrate channel;

storing an input byte from said first subrate channel at a time designated for accessing said first subrate channel and at a location associated with said identity of said first subrate channel for an interval of time defined by said predetermined byte rate;

reading said identity of said first subrate channel at a time designated for accessing said second subrate channel at said location associated with the identity of said second subrate channel;

reading said input byte stored from said first subrate channel at said location defined by said identity of said first subrate channel; and transmitting said input byte stored from said first subrate channel to said second subrate channel.

17. The method of claim 16 in which said interval of time defined by said predetermined byte rate is a multiple of the interbyte interval of said predetermined byte rate.

18. The method of claim 16 in which said interval of time defined by said predetermined byte rate is the interbyte interval of said predetermined byte rate.

19. In a time-division multiplexed switching system for switching multirate digitized byte-organized signals from source channels carried on input digital carrier lines to destination channels carried on output digital carrier lines, each of said source and destination channels having a predetermined byte rate and each having associated designated time intervals for accessing said channels, each of said source and destination subrate channels being transmitted on full-rate channels, a method of switching the signals from a first one of said source subrate channels of said input digital carrier lines to a second one of said destination subrate channels of said output digital carrier lines, comprising the steps of:

measuring the frame offset of said first subrate channel;

storing an identity of said first subrate channel, said identity modified in accordance with said frame offset, at a location associated with the identity of said second subrate channel;

storing an input byte from said first subrate channel at a time designated for accessing said first subrate channel and at a location associated with said identity of said first subrate channel for an interval of time equal to the interbyte interval of the predetermined byte rate of said first and second subrate channels;

reading said identity of said first subrate channel at a time designated for accessing said second subrate channel at said location associated with the identity of said second subrate channel;

reading said input byte stored from said first subrate channel at said location defined by said identity of said first subrate channel; and transmitting said input byte stored from said first subrate channel to said second subrate channel.

20. The method of claim 19 further comprising the step of:

storing an indication of the subrate of each full-rate channel;

and in which said step of storing an input byte from said first subrate channel comprises the steps of:

generating a storage address defined by said identity of said first subrate channel and the stored indication of the subrate of the full-rate channel which transmits said first subrate channel; and storing an input byte from said first subrate channel at said storage address.

21. The method of claim 19 further comprising the step of:

storing an indication of the subrate of each full-rate channel;

and in which said step of storing an input byte from said first subrate channel comprises the steps of:

generating a plurality of current frame numbers for partial superframes of the switching systems;

accessing the stored indication of the subrate of the full-rate channel which transmits said first subrate channel;

selecting one of said plurality of current frame numbers on the basis of said stored indication of the subrate;

generating a storage address defined by the identity of said first subrate channel and said selected one of said plurality of current frame numbers; and storing an input byte from said first subrate channel at said storage address.

22. In a time-division multiplexed switching system for switching multirate digitized byte-organized signals from source channels carried on input digital carrier lines to destination channels carried on output digital carrier lines, each of said source and destination channels having a predetermined byte rate and each having associated designated time intervals from accessing said channels, each of said source and destination subrate channels being transmitted on full-rate channels, a method of switching the signals from a first one of said source subrate channels of said input digital carrier lines to a second one of said destination subrate channels of said output digital carrier lines, comprising the steps of:

measuring and storing the frame offset of each full-rate channel;

storing an indication of the subrate of each full-rate channel;

storing the identity of said first subrate channel at a location associated with the identity of said second subrate channel;

accessing said stored indication of the subrate and the frame offset of the full-rate channel which transmits said first subrate channel;

generating a storage address defined by the identity of said first subrate channel and said accessed stored indications;

storing an input byte from said first subrate channel at said storage address at a time designated for accessing said first subrate channel for an interval of time equal to the interbyte interval of the predetermined rate of said first and second subrate channels;

reading said identity of said first subrate channel at a time designated for accessing said second subrate channel at said location associated with the identity of said second subrate channel;

reading said input byte stored from said first subrate channel at said location defined by said identity of said first subrate channel; and transmitting said input byte stored from said first subrate channel to said second subrate channel.

23. In a time-division multiplexed switching system for switching multirate digitized byte-organized signals from source channels carried on input digital carrier lines to destination channels carried on output digital carrier lines, each of said source and destination channels having a predetermined byte rate and each having associated designated time intervals for accessing said channels, each of said input digital carrier lines carrying a predetermined plurality of full-rate channels, a method of switching the signals from a first one of said source subrate channels of said input digital carrier lines to a second one of said destination subrate channels of said output digital carrier lines, said first source and second destination subrate channels operating at a predetermined byte rate, comprising the steps of:

determining the frame offset of signals of said first subrate channel;

calculating an identity of said first subrate channel adjusted for said frame offset;

storing the identity of said second subrate channel at a location associated with said identity of said first subrate channel;

reading said identity of said second subrate channel at the time designated for accessing said first subrate channel, at said location associated with the identity of said first subrate channel;

storing an input byte from said first subrate channel at said time designated for accessing said first subrate channel and at a location defined by said identity of said second subrate channel for an interval of time defined by said predetermined byte rate;

reading said input byte stored from said first subrate channel at said location defined by said identity of said second subrate channel at the time designated for accessing said second subrate channel; and transmitting said input byte stored from said first subrate channel to said second subrate channel.

24. The method of claim 23 in which said interval of time defined by said predetermined byte rate is a multiple of the interbyte interval of said predetermined byte rate.

25. The method of claim 23 in which said interval of time defined by said predetermined byte rate is the interbyte interval of said predetermined byte rate.

26. In a time-division multiplexed switching system for switching multirate digitized byte-organized signals from source channels carried on input digital carrier lines to destination channels carried on output digital carrier lines, each of said source and destination channels having a predetermined byte rate and each having associated designated time intervals for accessing said channels, each of said source and destination channels being transmitted on full-rate channels, a method of switching the signals from a first one of said source subrate channels of said input digital carrier lines to a second one of said destination subrate channels of said output digital carrier lines, comprising the steps of:

measuring the frame offset of said second subrate channel;

storing an identity of said second subrate channel, said identity modified in accordance with said frame offset, at a location associated with the identity of said first subrate channel;

reading said identity of said second subrate channel at the time designated for accessing said first subrate channel, at said location associated with the identity of said first subrate channel;

storing an input byte from said first subrate channel at said time designated for accessing said first subrate channel and at a location defined by said identity of said second channel for an interval of time equal to the interbyte interval of the predetermined byte rate of said first and second subrate channels;

reading said input byte stored from said first subrate channel at said location defined by said identity of said second subrate channel at the time designated for accessing said second subrate channel; and transmitting said input byte stored from said first subrate channel to said second subrate channel.

27. The method of claim 26 further comprising the step of:

storing an indication of the subrate of each full-rate channel;

and in which said step of reading an input byte from said first subrate channel comprises the steps of:

generating a storage address defined by the identity of said second subrate channel and the stored indication of the subrate of the full-rate channel which transmits said second subrate channel; and reading an input byte from said first subrate channel at said storage address.

28. The method of claim 26 further comprising the step of:

storing an indication of the subrate of each full-rate channel;

and in which said step of reading an input byte from said first subrate channel comprises the steps of:

generating a plurality of current frame numbers for partial superframes of the switching system;

accessing the stored indication of the subrate of the full-rate channel which transmits said second subrate channel;

selecting one of said plurality of current frame numbers on the basis of said stored indication of the subrate;

generating a storage address defined by the identity of said second subrate channel and said selected one of said plurality of current frame numbers; and reading an input byte from said first subrate channel at said storage address.

29. In a time-division multiplexed switching system for switching multirate digitized byte-organized signals from source channels carried on input digital carrier lines to destination channels carried on output digital carrier lines, each of said source and destination channels having a predetermined byte rate and each having associated designated time intervals for accessing said channels, each of said source and destination channels being transmitted on full-rate channels, a method of switching the signals from a first one of said source subrate channels of said input digital carrier lines to a second one of said destination subrate channels of said output digital carrier lines, comprising the steps of:

storing an indication of the subrate of each full-rate channel;

measuring and storing an indication of frame offset of each full-rate channel;

storing the identity of said second subrate channel at a location associated with the identity of said first subrate channel;

reading said identity of said second subrate channel at the time designated for accessing said first subrate channel, at said location associated with the identity of said first subrate channel;

storing an input byte from said first subrate channel at said time designated for accessing said first subrate channel and at a location defined by said identity of said second subrate channel for an interval of time equal to the interbyte interval of the predetermined byte rate of said first and second subrate channels;

accessing said stored indication of the subrate and the frame offset of the full-rate channel which transmits said second subrate channel;

generating a storage address defined by the identity of said second subrate channel and said accessed stored indications;

reading an input byte from said first subrate channel at said storage address at a time designated for accessing said second subrate channel; and transmitting said input byte stored from said first subrate channel to said second subrate channel.

30. A time division multiplex switching system for switching multirate digitized byte-organized signals from one source channel carried on one input digital carrier line to a plurality of destination channels carried on output digital carrier lines, said source channel having a predetermined byte rate, comprising:

means for generating timing signals defining intervals for digital carrier timing;

means responsive to said timing signals for generating sequential address signals;

digital line controller (DLC) means responsive to said timing signals for assembling byte-organized input signals from said input digital carrier line into DLC output signals and for distributing byte-organized DLC input signals to said plurality of destination channels on said output digital carrier lines;

signal memory means having the capacity to store at least one byte of said byte-organized signals for said source channel for an interval of time defined by the byte rate of the source channel;

control memory means for storing at least one signal memory address for each of said plurality of destination channels in said output digital carrier lines and for generating signal memory addressing signals;

said signal memory means being responsive to said signal memory addressing signals and to said sequential address signals to store successive bytes of said DLC output signals and to generate successive bytes of said DLC input signals.

* * * * *

UNITED STATES PATENT AND TRADEMARK OFFICE
CERTIFICATE OF CORRECTION

PATENT NO. : 4,547,877
DATED : October 15, 1985
INVENTOR(S) : Harvey R. Lehman, Matthew F. Slana It is certified that error appears in the above-identified patent and that said Letters Patent is hereby corrected as shown below:

Column 20, Claim 13, line 54, change "by" to --of--.

Signed and Sealed this

Twenty-eighth Day of January 1986

[SEAL]

Attest:

DONALD J. QUIGG

Attesting Officer

Commissioner of Patents and Trademarks